Oct. 28, 1947.  P. H. TRICKEY  2,429,903
VENTILATION OF SMALL ELECTRIC MOTORS
Filed Oct. 19, 1943

Inventor
Philip H. Trickey
By John F. Heine
Attorney

Witness:
Godfrey Pecina

Patented Oct. 28, 1947

2,429,903

UNITED STATES PATENT OFFICE 2,429,903

VENTILATION OF SMALL ELECTRIC MOTORS

Philip H. Trickey, North Plainfield, N. J., assignor to The Singer Manufacturing Company, Elizabeth, N. J., a corporation of New Jersey Application October 19, 1943, Serial No. 506,817

5 Claims. (Cl. 172—36)

1

This invention relates to electric motors and more particularly to means for ventilating small alternating current motors.

In normal alternating current motors the laminations forming the rotor and stator together with the windings present a solid mass of steel and copper except for the air gap separating the rotor from the stator and, therefore, the conventional method such as used on direct current motors, of circulating air through the motor becomes impractical. In some instances holes have been drilled or punched in the core of the rotor parallel to the shaft for the purpose of permitting a certain amount of air to be drawn through the motor from one end to the other in the same manner as in direct current motor ventilation.

A more common method of ventilating a small alternating current motor is, to draw air by means of a fan, through holes located adjacent the shaft bearing in the end-bonnet and circulate it in the end of the motor, and finally exhaust it at the same end of the motor through peripheral openings in the end-bonnet. However, in very small alternate current motors it becomes impractical, because of space limitations, to provide holes in the rotor for the purpose of ventilation. Also the method of drawing in air through holes adjacent the end-bonnet and blowing it out through peripheral openings in the frame has serious disadvantages. One disadvantage is the physical size of the parts, especially when the rotor shaft is journalled in ball bearings, there being insufficient space close to the bearing for the intake openings. Another disadvantage, which is probably the most serious, is that the exhaust air stream is so close to the intake air stream that a large amount of recirculation of the air takes place. Further the nearness of the exhaust and intake ports causes a certain amount of friction between the adjacent oppositely directed air streams thus reducing the effectiveness of the fan.

It is the object of my invention to overcome the difficulties heretofore attendant in small size alternating current motors, and to provide a simple inexpensive and effective means of drawing the intake cooling air from the periphery of the motor casing and also discharging the cooling air through openings at the periphery of the motor.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figure 1:
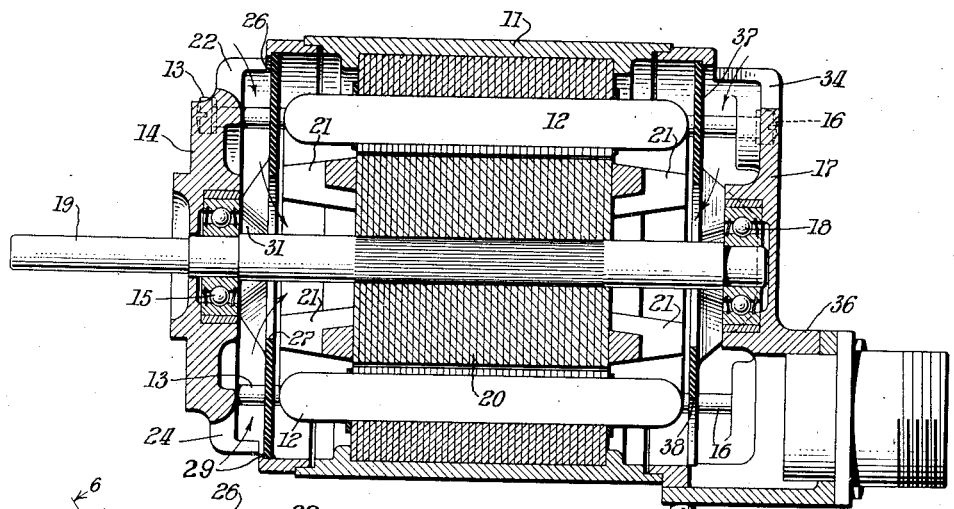
Fig. 1 is a vertical section taken through a motor embodying my invention.

In the embodiment of the invention selected for illustration my improved motor ventilating means is shown embodied in a motor having a cylindrically shaped frame, including a stator 11 having the usual field coils 12. Secured to the stator 11 by the screws 13 is an end-bonnet 14 in which is secured a ball-bearing 15. Secured to the other end of the stator by the screws 16 is a bell-shaped end-bonnet 17 carrying a ball bearing 18. Journalled in the ball bearings 15 and 18 is a shaft 19, carrying a cylindrically shaped rotor 20. Each end of the rotor 20 is provided with a plurality of laterally extending blades 21 which act as a center intake centrifugal fan when the motor is in operation.

The end-bonnet 14 is formed with four ventilating openings 22, 23, 24 and 25 located near the outer periphery of the end-bonnet and spaced 90° apart. Pressed into the end-bonnet and located between the inner walls of the openings and the motor is a disk shaped baffle 26 formed with a centrally located circular aperture 27 through which the shaft 19 extends. The baffle 26 is also formed with circumferential spaced grooves 28 which receive the screws 13, thus preventing the baffle from turning about its axis. Also the baffle 26 is forced against a shoulder 29 formed in the end-bonnet and, in addition to the press-fit, any suitable means may be employed for holding the baffle against the shoulder.

Figures 2, 3:
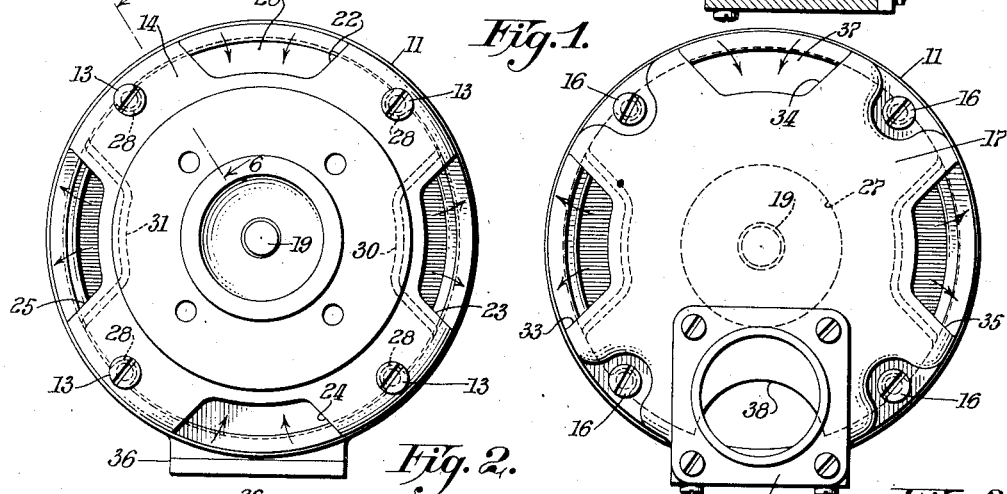
Figs. 2 and 3 show right and left end elevations of the motor shown in Fig. 1.
Figures 4, 5, 6:
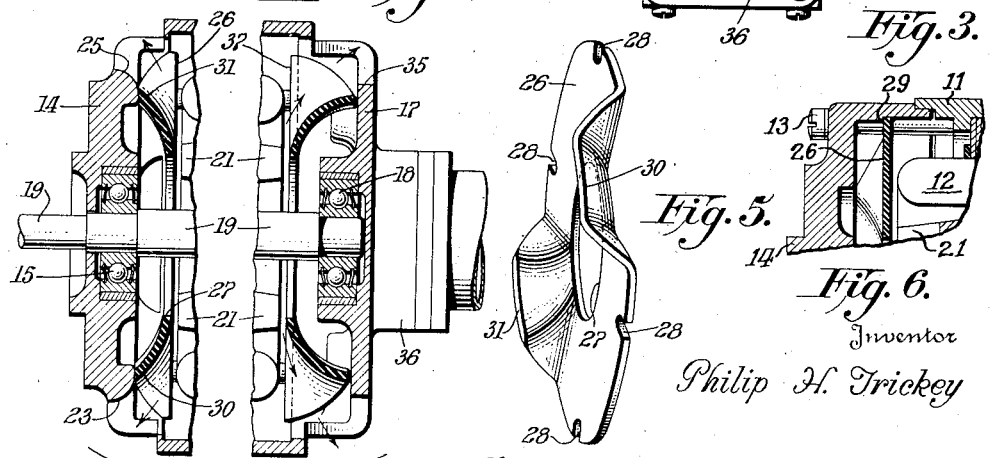
Fig. 4 shows fragmentary sectional views of the right and left ends of the motor, the sections being taken at 90° relative to the section shown in Fig. 1.
Fig. 5 is a perspective view of the baffle.
Fig. 6 is a fragmental sectional view taken along the line 6—6 of Fig. 2, showing the construction of the end-bonnets at points between the openings formed therein.

In order to provide an air channel leading from the motor to the openings 23 and 25 the disk is formed with two outwardly flared lips 30, 31 which are disposed at 180° apart. As shown in Fig. 2 these lips are substantially U-shaped in cross-section, forming, in effect, a trough and the outer edges of the lips extend outwardly into contact with the inner wall of the end-bonnet 14 at a point adjacent the outer walls of the openings 23 and 25.

The end-bonnet 17 of the motor is formed with the ventilating openings 33, 34 and 35, the opening 34 being at the top of the end-bonnet and the other openings spaced 90° therefrom. Also formed on the end-bonnet is a terminal box 36 through which the lead wires to the motor pass. A disk shaped baffle 37 is pressed into the end-bonnet 17, this disk being similar to the disk 26 except for the cut out 38 to provide an opening for the lead wires to the motor. The baffle 37 is held in the end-bonnet 17 in the same manner as the baffle 26 is held in the end-bonnet 14.

From the above it will be observed that when the motor is operated, air is drawn in through the openings 22 and 24, and through the centrally located aperture 27 due to the effect created by the blades 21. The air drawn into the center of the fan is thrown outwardly by centrifugal action and is forced through the channel formed by the lips 30, 31 and outwardly through the openings 23 and 25. The action at the right end of the motor as viewed in Fig. 1 is similar, except that the air is drawn in through only one opening 34 and is discharged through the two openings 33 and 35.

It will be understood that the baffles act as a partition and divide the space between each end-bonnet and the stator and rotor into an inner and outer compartment, the outer compartment having intake openings which are arranged 180° apart, and the inner compartment having exhaust openings also arranged 180° apart, there being a center intake centrifugal fan located in the inner compartment for drawing air from the outer compartment through the centrally located aperture 27 in the baffle 26 and discharging the air through the exhaust openings in the inner compartment after it has circulated in the inner compartment and cooled the field and stator of the motor. Also the end-bonnet 14 may be machined so that it may be placed against a flat surface, such as the wall of a housing with the motor shaft 19 extending through the wall and that in this position the wall will not interfere with the ventilation of the motor.

It will also be understood that the baffles may be made of material that is light in weight and as the baffle serves only as a partition the weight of the motor is only very slightly increased. Further, the overall dimensions of the motor are not increased.

From the foregoing description it will be observed that I have constructed a small sized alternating current motor having an improved form of ventilating means which does not appreciably increase the size and weight of motors. It will be apparent that the form and arrangement of the elements employed may be varied and, therefore, the privilege is reserved of resorting to all such legitimate changes therein as may be fairly embodied within the spirit and scope of the appended claims.

Having thus set forth the nature of the invention what I claim herein is:

1. A dynamo electric machine having in combination, a stator, a rotor having extending from the end thereof a plurality of fan blades of the centrifugal type, a bell-shaped end-bonnet for said motor, said end-bonnet being spaced from said rotor and formed with a plurality of openings in its outer periphery, and a baffle located in the space between the end-bonnet and rotor and dividing the space into two compartments, one compartment being an intake compartment and connected to certain of the peripheral openings and the other compartment being an exhaust compartment and connected by trough-like peripheral portions formed in the baffle to other of the peripheral openings, said baffle having a central aperture which connects the compartments and admits air from the intake compartment to the center of the centrifugal fan.

2. A dynamo electric machine having in combination, a bell-shaped end-bonnet formed on its outer periphery with a plurality of spaced openings, a disk formed with a central aperture and carried by said end-bonnet, said disk having its major portion located at one side of said openings, and having a plurality of lateral distorted portions which extend across some of the openings to the other side thereof, a stator, a rotor journaled in said end-bonnet, said rotor being provided with a centrifugal fan of the center intake type whereby air is drawn through some of the peripheral openings in the end-bonnet and the central aperture in the disk, and circulated by the fan about the end of the stator and then discharged through the laterally distorted portions of the disk through the other peripheral openings.

3. An electric motor having a cylindrical frame including a pair of end-bonnets, stator laminations supported within said frame, said frame having an air chamber at each end of the stator laminations, a rotor journaled in said end-bonnets and having air impeller blades within each of said chambers, said end-bonnets having peripherally disposed air intake and air discharge openings and a disk shaped baffle disposed in each of said air chambers, each of said baffles having its major portion located on one side of the openings in the periphery of the end-bonnet and also having distorted trough-shaped portions which extend across some of the peripheral openings and into engagement with the wall of the end-bonnet on the other side of the said openings, said baffle also having a central aperture closely adjacent the air impeller.

4. An alternating current electric motor having an end-bonnet formed with peripheral openings, a stationary baffle carried by said end-bonnet and comprising a circular disk having a central air passageway and trough-like peripheral portions deformed to one side of the plane of said disk, said trough-like portions providing air egress passageways leading to certain of said openings and the portion of the disk between the trough shaped portions providing air ingress passageways leading from other of said peripheral openings to said central opening.

5. An electric motor having a hollow cylindrical stator frame including end-bonnets, a stator core, a rotor disposed within said stator core and carrying fan blades at the ends thereof, said stator frame having air chambers adjacent the end-bonnet, said end-bonnets being formed with openings in its periphery arranged at 90° apart circumferentially, and a thin lightweight baffle disposed within each air chamber and having a central aperture and distorted trough-like peripheral portions arranged 180° apart, the major portion of said baffle being disposed in a plane at one side of said openings with said trough-like portions extending across to the other side of said openings, whereby air for ventilating the motor is drawn in certain of said openings and discharged through openings disposed at 90° to the openings through which the air is drawn.

PHILIP H. TRICKEY.

REFERENCES CITED

The following references are of record in the file of this patent:

UNITED STATES PATENTS

| Number | Name | Date |
|---|---|---|
| 482,389 | Skobis | Sept. 13, 1892 |
| 2,171,321 | Miller | Aug. 29, 1939 |
| 727,686 | Priest | May 12, 1903 |
| 819,820 | Tingley | May 8, 1906 |
| 1,261,386 | Hellmund | Apr. 2, 1918 |
| 1,267,983 | Curtis | May 28, 1918 |
| 1,677,433 | Daun | July 17, 1928 |
| 1,907,230 | Yost | May 2, 1933 |

FOREIGN PATENTS

| Number | Country | Date |
|---|---|---|
| 502,059 | Germany | Mar. 26, 1931 |